(12) United States Patent
Nappier et al.

(10) Patent No.: US 7,614,832 B2
(45) Date of Patent: Nov. 10, 2009

(54) COUNTERSINK DRILL SYSTEM

(75) Inventors: David N. Nappier, Caseyville, IL (US);
Dorothy A. Nappier, legal representative, Caseyville, IL (US);
James L. Morrison, O'Fallon, MO (US); David L. Fritsche, Forristell, MO (US)

(73) Assignee: The Boeing Company, Chicago, IL (US)

( * ) Notice: Subject to any disclaimer, the term of this patent is extended or adjusted under 35 U.S.C. 154(b) by 412 days.

(21) Appl. No.: 11/392,100

(22) Filed: Mar. 28, 2006

(65) Prior Publication Data

US 2007/0147968 A1    Jun. 28, 2007

Related U.S. Application Data

(60) Provisional application No. 60/753,574, filed on Dec. 22, 2005.

(51) Int. Cl.
*B23B 47/22* (2006.01)
(52) U.S. Cl. .............................. 408/10; 408/15; 408/130
(58) Field of Classification Search ...................... 408/8, 408/10, 13, 14, 15, 95, 97, 110, 112, 130
See application file for complete search history.

(56) References Cited

U.S. PATENT DOCUMENTS

| | | | | | |
|---|---|---|---|---|---|
| 2,706,917 | A | * | 4/1955 | Hill | 408/94 |
| 2,865,236 | A | * | 12/1958 | Parke | 408/130 |
| 2,986,957 | A | * | 6/1961 | Klancnik | 408/130 |
| 3,078,742 | A | * | 2/1963 | Svenson | 408/10 |
| 3,663,138 | A | * | 5/1972 | Petroff | 408/130 |
| 3,767,313 | A | * | 10/1973 | Bohoroquez et al. | 408/14 |
| 3,885,635 | A | * | 5/1975 | Menzel | 173/146 |
| 4,123,187 | A | * | 10/1978 | Turner | 408/17 |
| 4,453,868 | A | * | 6/1984 | Winslow | 408/138 |
| 4,594,030 | A | * | 6/1986 | Weigel, Jr. | 408/10 |
| 4,867,617 | A | * | 9/1989 | Maass et al. | 408/17 |
| 5,222,844 | A | * | 6/1993 | Maass et al. | 408/17 |

* cited by examiner

*Primary Examiner*—Daniel W Howell
(74) *Attorney, Agent, or Firm*—Tung & Associates

(57) ABSTRACT

A portable, air powered drill has an automated feed system and an adjustable dwell for producing countersunk holes in a workpiece. The feed system uses hydraulic cylinders and pneumatic control logic to control the feed rate, and the dwell time of a countersink drill bit at the end of the drill stroke. A movable mechanical stop permits an operator user to adjust countersink depth. The control logic provides fully automatic feed of the drill bit, and adjustment of the dwell time to consistently produce identical countersunk holes in a variety of workpiece materials.

17 Claims, 4 Drawing Sheets

COUNTERSINK DRILL SYSTEM

CROSS-REFERENCE TO RELATED APPLICATIONS

This application claims the benefit of a provisional application No. 60/753,574 filed Dec. 22, 2005 under 35 USC Section 119 (e).

FIELD OF THE INVENTION

This invention generally relates to power operated drills, and deals more particularly with a portable drill having an automated feed and adjustable dwell for producing countersunk holes.

BACKGROUND OF THE INVENTION

Countersunk holes are commonly used throughout industry where it is necessary or desirable to recess the head of a fastener, such as a screw or rivet. For example, countersunk holes are extensively employed in the aircraft industry, where rivets are used to attach an outer skin to frame members. In this latter mentioned application, it is particularly important that the top of the rivet be flush with the outer surface of the skin, otherwise non-flush rivets disturb the airflow over the skin, creating turbulence which adds to drag on the aircraft. Consequently, it is important that the tapered side walls of the hole countersink have a precise depth calculated so that the top of the rivet is flush with the skin surface.

In the past, forming a countersunk hole in aircraft applications was a two step, manual process that involved drilling a hole of the desired diameter in a first operation, and then countersinking the hole with a countersink tool in a second operation. Because two steps were required using two different tools, the process was time consuming. In addition, because the process was performed manually, consistent results depended in large part on the skill of the operator.

Accordingly, there is a need in the art for a countersink drill that overcomes the deficiencies of the prior art discussed above. The present invention is directed towards satisfying this need.

SUMMARY OF THE INVENTION

According to one aspect of the invention, a portable drill comprises stationary and movable portions and a feed motor for displacing the movable portion between home and displaced positions. The stationary portion is adapted to be mounted in a fixed position relative to a workpiece in which a hole is to be drilled. The moveable portion is mounted on the stationary portion for linear movement between the home and displaced positions, respectively representing top-of-stroke and bottom-of-stroke drill positions. The moveable portion includes a mount upon which a drill motor is attached. The stationary portion has an adjustable stop for limiting the displacement of the moveable portion and thereby determine the depth of the hole countersink. A dwell control is provided for controlling the length of time the drill remains in its displaced, bottom-of-stroke position. Displacement of the drill is performed automatically by a pneumatic control system.

According to another aspect of the invention, a drill is provided for use in a portable drill fixture for simultaneously drilling and countersinking a hole in a workpiece. The drill comprises a support attachable to the drill fixture; a mount carried on the support for linear movement toward and away from the workpiece; a drill motor carried on and moveable with the mount between top-of-stroke and bottom-of-stroke positions; a countersink drill bit driven by the drill motor; and, a drive system for automatically displacing the mount between the top-of-stroke and bottom-of-stroke positions. The drive system automatically feeds the drill bit into the workpiece so that the hole is drilled and countersunk in a single drill stroke. The drive system includes an adjustable dwell control for controlling the length of time the drill bit remains in the bottom-of-stroke position. The drive control also has an adjustable depth control for controlling the depth of the hole countersink.

According to still another aspect of the invention, a portable countersink drill is provided for drilling a countersunk hole in a workpiece. The drill comprises a drill motor for driving a countersink drill bit; a power operated drive for automatically moving the drill motor and drill bit through a drill stroke from a top-of-stroke position to a bottom-of-stroke position in which the drill bit drills and countersinks the hole; and, a dwell adjustment for adjusting the length of time that the drill motor dwells at the bottom-of-stroke position. The dwell adjustment includes a switch actuated by the drive when the drill motor reaches its bottom-of-stroke position, and a pneumatic control system responsive to actuation of the switch for delaying the return of the drill motor from its bottom-of-stroke position. The drive further includes an adjustable depth control for controlling the depth of the hole countersink.

An important advantage of the invention resides in its ability to form a countersink hole in a single drill stroke, and without the need for changing drill bits. Further, the automatic control of the present drill provides improved hole-to-hole consistency and better control of countersink depth. Automatic control of the drill assures controlled, repeatable feed rate for various types of workpiece materials. A further feature of the invention lies in its ability to control dwell time of the drill bit at the bottom-of-stroke position, thereby assuring that the hole countersink is fully formed.

Various additional objects, features and advantages of the present invention can be more fully appreciated with reference to the detail description and accompanying drawings that follow.

DETAILED DESCRIPTION OF THE PREFERRED EMBODIMENTS

Figure 1:
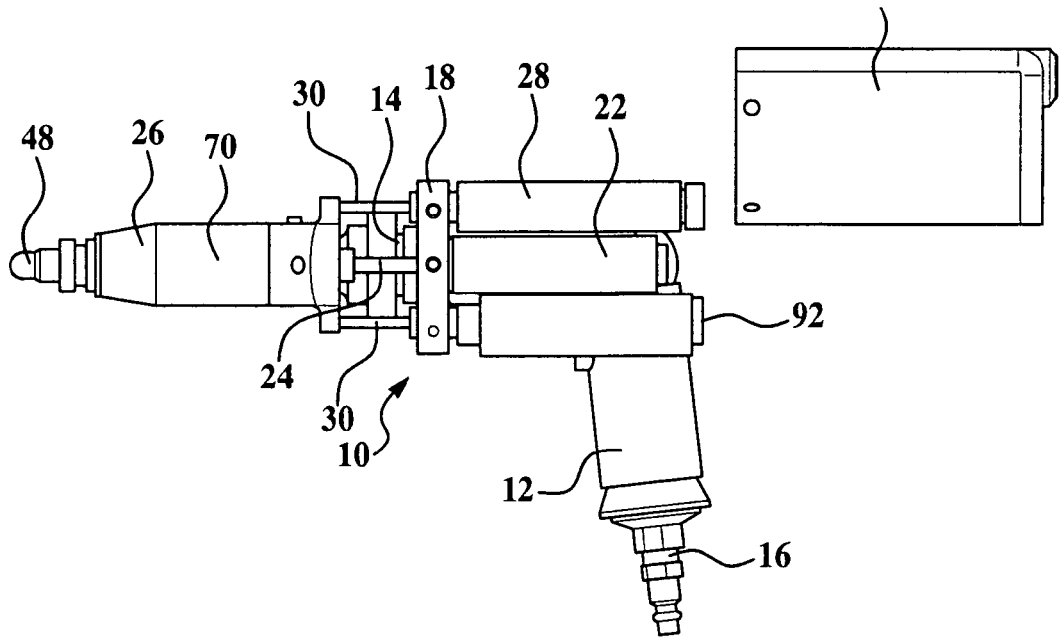
FIG. 1 is a view of one side of the countersink drill of the present invention, a cover having been removed to show internal parts of the drill.
Figure 2:
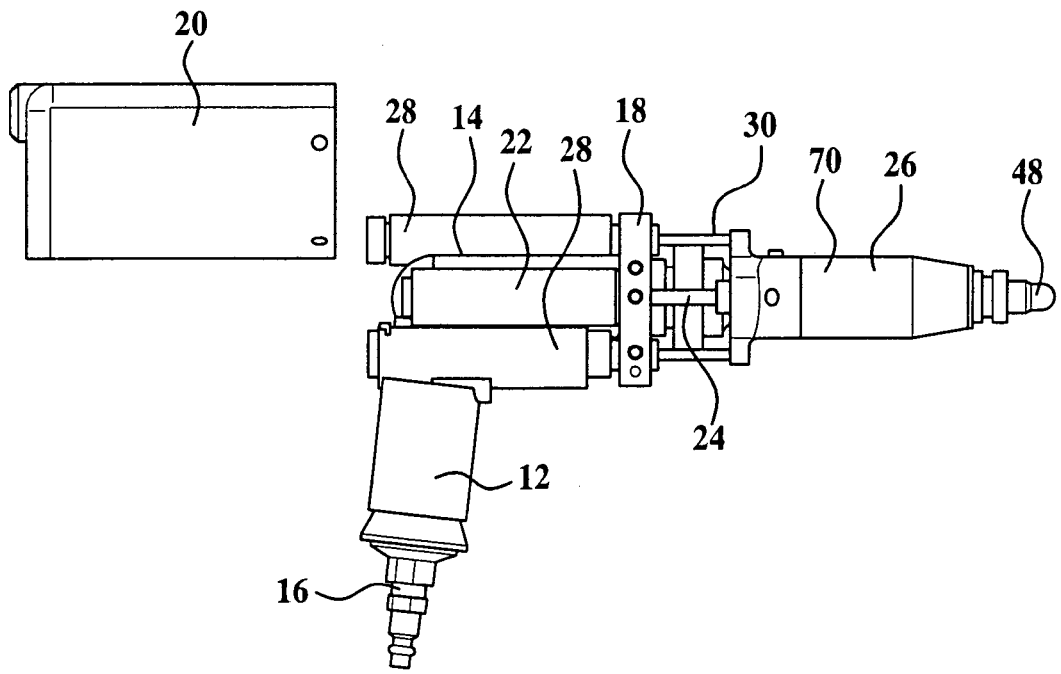
FIG. 2 is a view of the opposite side of the drill shown in FIG. 1.
Figure 3:
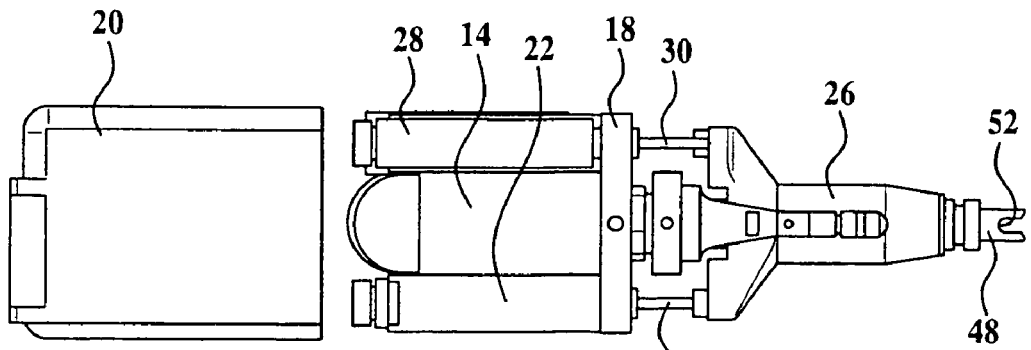
FIG. 3 is a top view of the drill shown in FIG. 1.
Figure 4:
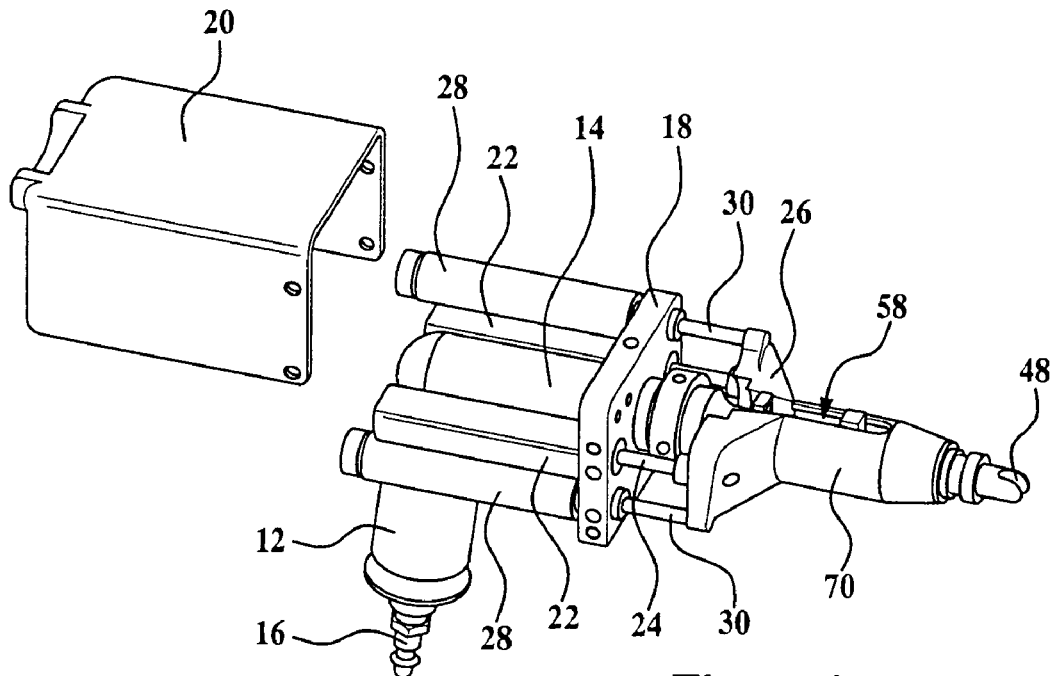
FIG. 4 is a perspective view of the drill shown in FIG. 1.
Figure 5:
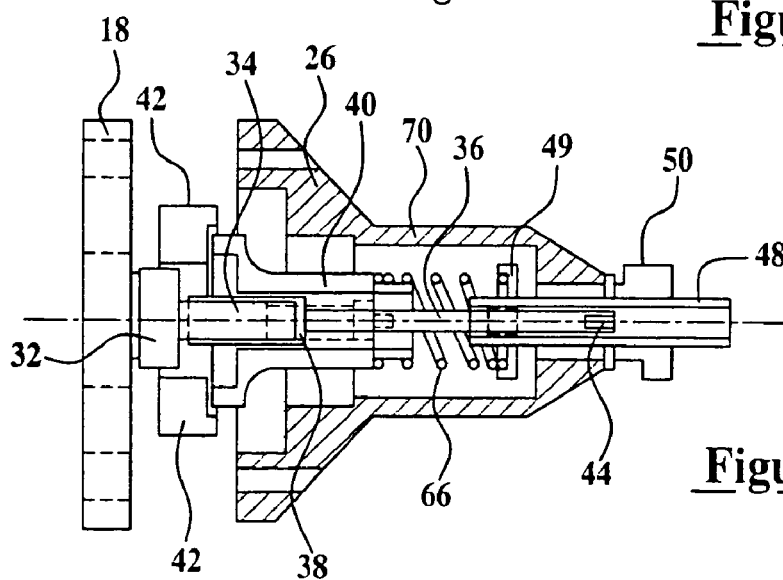
FIG. 5 is a cross sectional view taken in a horizontal plane through forward portions of the drill shown in FIG. 1.
Figure 6:
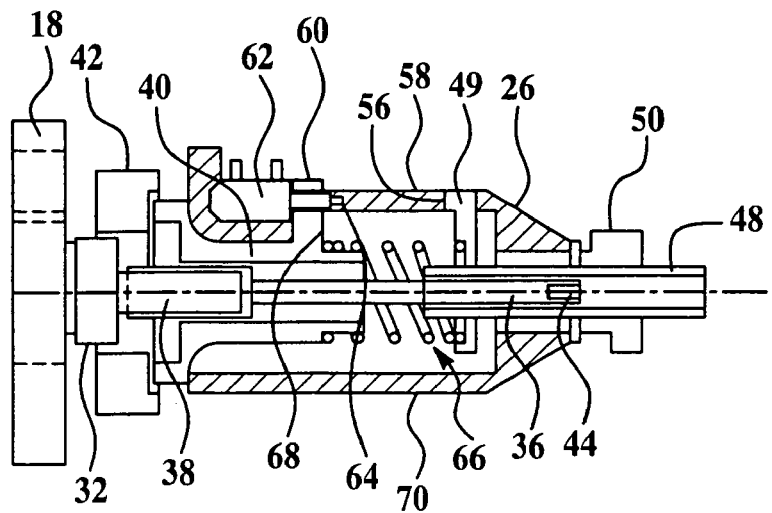
FIG. 6 is a cross sectional view of the drill portion shown in FIG. 5 but taken through a vertical plane.
Figure 7:
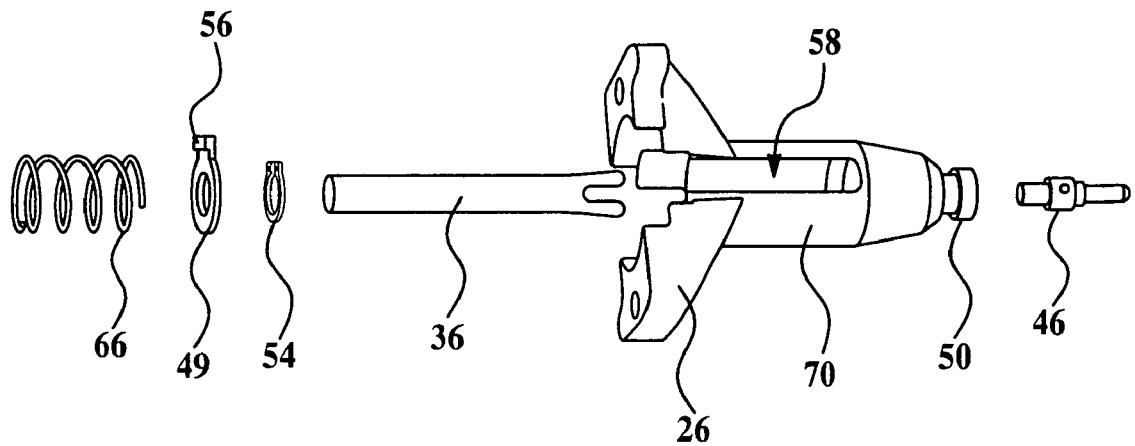
FIG. 7 is an exploded, perspective view of certain components shown in FIGS. 5 & 6.
Figure 8:
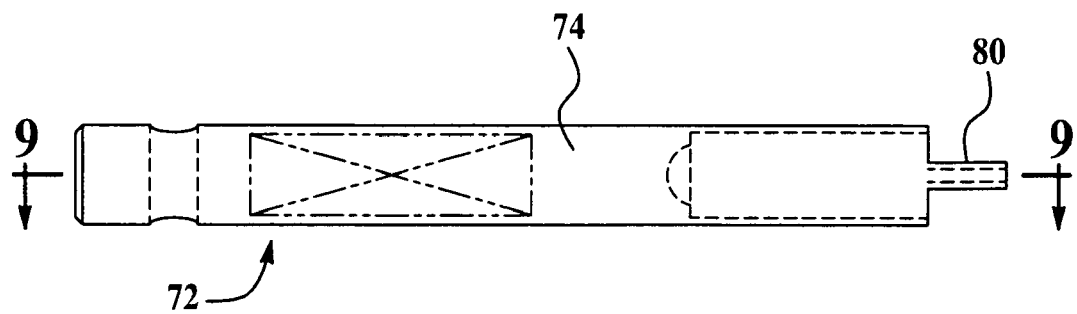
FIG. 8 is a side elevational view of a tool used to install and remove the drill bit used in the countersink drill.
Figure 9:
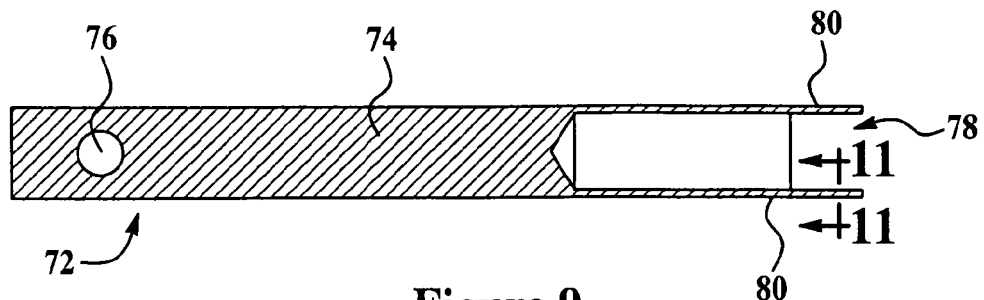
FIG. 9 is a sectional view taken along the line 9-9 in FIG. 8.
Figure 10:
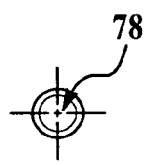
FIG. 10 is an end view of the tool shown in FIG. 8.

Referring first to FIGS. 1-7, a pneumatically driven countersink drill 10 has a handle 12 connected with a pneumatic drill motor 14 and a pneumatic coupling 16 adapted to be coupled with a source of pressurized air. The drill motor 14 includes a cylindrical body which passes through and is secured to a generally rectangular bulkhead 18. An outer cover 20 protectively encloses internal parts of the drill 10 and is secured to the bulkhead 18, as with screws (not shown). A pair of pneumatic cylinders 22 are secured to opposite sides of the bulkhead 18 and have corresponding linear drive shafts 24 secured to a nosepiece 26. A pair of hydraulic check cylinders 28 are also secured to the bulkhead and have output shafts 30 secured to the nosepiece 26. The bulkhead 18 is slideably mounted on the nosepiece 26 by means of shafts 24, 30.

The outer end of motor 14 is provided with a drill motor gearbox 32 which gears down an output shaft 34 to a desired speed. The output shaft 34 is coupled to an arbor 36 by means of a threaded sleeve 38. A generally cylindrical aft stop 40 is received within a cylindrical opening within the nosepiece 26 and is secured to a countersink depth adjustment ring 42. Ring 42 is mounted by threads (not shown) on the gearbox 32. Rotation of adjustment ring 42 adjusts the longitudinal position of the aft stop 40, and thus the depth of the countersink.

The outer end of arbor 36 is provided with a threaded internal opening 44 which receives the threaded end of a countersink drill bit 46. Arbor 36 is journalled for rotation within a nose bushing 48 which is secured to the nosepiece 26 by means of a nose lock-on 50. The outer end of the nose bushing 48 is provided with opposed slots 52 to permit a tool, such as an allen wrench, to be inserted into an allen head set screw that locks the bit 46 on the arbor 36. A forward stop 49 is secured to the nose bushing 48 by means of a snap ring 54, and includes an anvil 56 which extends upwardly through a longitudinal slot 58 in the nosepiece 26. The aft stop 40 includes an upstanding ear 60 in which there is mounted a pneumatic dwell valve 62 having a plunger actuator 64. Plunger actuator 64 is longitudinally aligned with and engages the anvil 56 when the drill 10 reaches the bottom of its drill stroke.

A compression spring 66 sleeved over one end of the nose bushing 48, is captured between the forward stop 49 and a shoulder 68 formed on the aft stop 40. Spring 66 biases the aft stop 40, and thus bulkhead 18, away from the workpiece toward its top-of-stroke position. The nosepiece 26 includes a cylindrical intermediate body 70 which may be clamped or otherwise removably attached to a drill fixture (not shown) which is used to precisely position the drill 10 over a workpiece (not shown). It may thus be appreciated that the nosepiece 26, along with lock-on 50, bushing 18 and the forward stop 49 are held stationary on the drill fixture during a drilling operation. On the other hand, the bulkhead 18 along with adjustment ring 42, gearbox 32, aft stop 40, arbor 36 and the drill motor 14 move linearly relative to the nosepiece 26 from a starting, top-of-stroke position to a bottom-of-stroke position in which the countersunk hole is fully formed. The relative movement between the nosepiece 26 and bulkhead 18 is produced by the pneumatic cylinders 22 which effectively function to feed the drill bit 46 into the workpiece.

Figure 11:
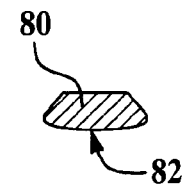
FIG. 11 is a sectional view taken along the line 11-11 in FIG. 9; and, FIG. 12 is a combined block and schematic diagram of a pneumatic control system for the countersink drill

A hand tool 72, shown in FIGS. 8-11, is used to install and remove the drill bit 46 from the drill 10, and obviates the need to remove the entire nosepiece 26 in order to switch out the bit. The tool 72 includes a cylindrical body 74, preferably formed of metal, having a hollow end defined by an axial opening 78 adapted to receive a portion of the drill bit 46 therein. A pair of diametrically opposed legs 80 extend longitudinally from the side walls of the body, adjacent the opening 78. As best seen in FIG. 11, each of the legs 80 includes an outer surface 82 possessing a curvature matching that of the inside wall of the nose bushing 48. A pair of handles 76 extend oppositely from the other end of the body 74, forming a T-grip that may be grasped by an operator and used to turn the tool 72 during installation/removal of the drill bit 46.

In use, the operator inserts the hollow end of the tool 72 into the nose busing 48 so that the drill bit is received within the axial opening 78. The operator then rotates the tool 72 until the legs 80 engage lateral protrusions on the drill bit 46. These protrusions may comprise allen head screws or pins secured to the drill bit 46. Rotation of the tool 72 screws the drill bit 46 either into or out of the threaded opening 44 in the arbor 36.

Figure 12:
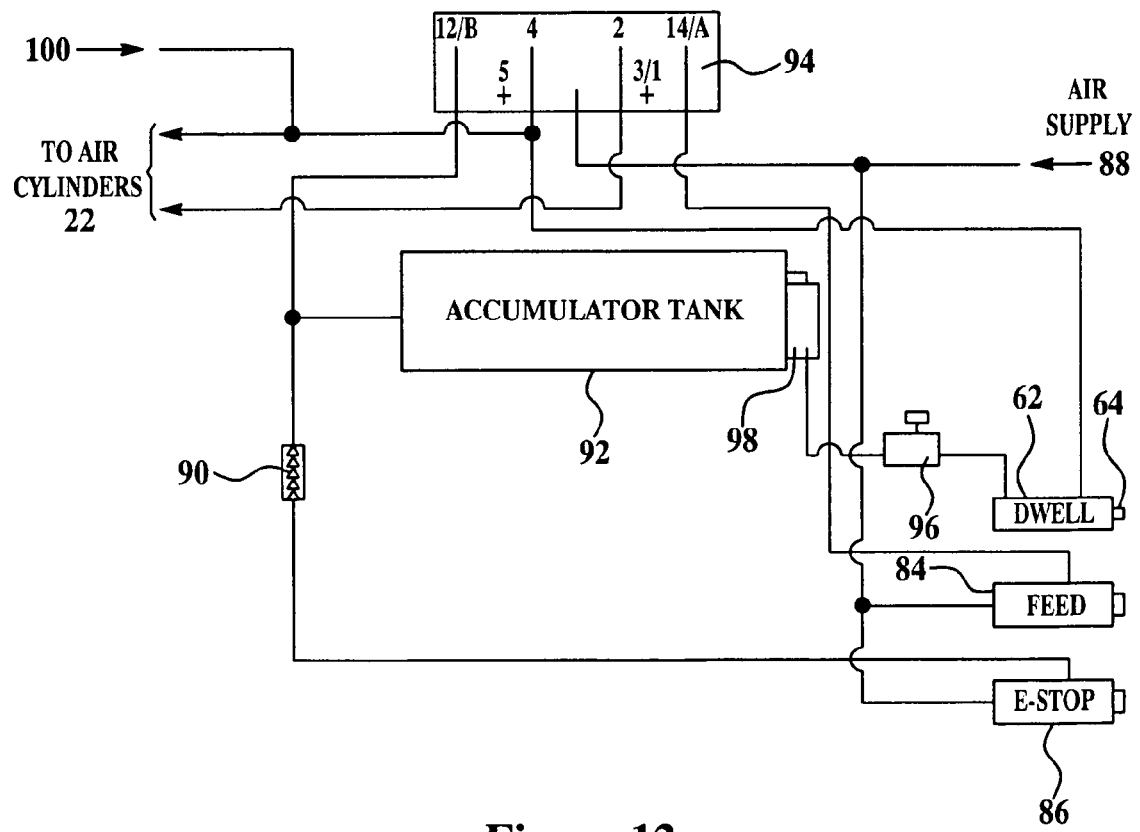

The operation of the drill 10 is controlled by a pneumatic control system, the details of which are shown in FIG. 12. A pair of push button actuated, two way pneumatic valves, 84, 86 are mounted on the rear end of the drill, passing through the cover 20 so as to be accessible by the operator. Valves 84, 86 may comprise, for example, MAV-2, two way, normally closed valves available from Clippard Instrument Laboratory. When actuated, valve 84 connects an air supply 88 with the air cylinders 22 to commence a drill feed cycle. Valve 86 controls the flow of air from the supply 76 through a check valve 90 to an accumulator tank 92 and pneumatic logic control 94. The check valve 90 may comprise an MCV-2 check valve available from Clippard Laboratories. Valve 86 when actuated, functions as an emergency stop which terminates the drill feed.

The pneumatic logic control 94 will be configured to meet the requirements of each particular application, however in the illustrated embodiment, the logic control 94 may comprise a controller available from Dynamco configured as a DA20D0A00. The pneumatic control 94 controls the flow of air between the various components of the control system.

The dwell valve 62 is connected through a restrictor valve 96 and dump valve 98 to accumulator tank 92, as well as to the pneumatic control 94. When the dwell valve plunger actuator 64 engages anvil 56, pressure is slowly reduced on dump valve 98 at a rate dependent upon the setting of the restrictor valve 96. When the pressure on dump valve 98 falls below a preset level, the air pressure within accumulator tank 92 is reduced, which in turn reduces the air pressure applied to cylinders 22. When the return force of spring 66 exceeds the force supplied by cylinders 22, the bulkhead 18 returns to its top-of-stroke position. The length of time (dwell) that the bulkhead 18, and thus the drill bit 46, remain at their bottom-of-stroke position depends on the setting of restrictor valve 96 which functions as a dwell adjustment. Normally, the dwell time is set so that the countersunk hole is fully formed before the drill bit 46 returns to its top-of-stroke position. The provision of an adjustable dwell accommodates variations in workpiece materials and the cutting efficiency of differing drill bits.

In operation, the drill 10 is clamped into a suitable drilling fixture (not shown) which is positioned on a workpiece with the drill bit 46 aligned with a point on the workpiece in which the countersunk hole is to be formed. The operator adjusts the countersink adjustment ring 42 to a desired countersink depth. This depth setting may be achieved through calibrations applied to the ring 42, or manually using a depth gauge fixture to set the maximum drill bit depth. The operator then actuates the push button feed valve 84, causing the pneumatic control 94 to initiate an automatic drill cycle. The operator also actuates a trigger actuator 100 which starts the drill motor 14. Pneumatic cylinders 22 move the bulkhead 18 toward the nosepiece 26, feeding the drill bit 46 into the workpiece at a controlled rate. Hydraulic cylinders 28 act to dampen and regulate movement of the bulkhead 18 during the feed process to assure a steady, regulated feed rate.

When the bulkhead 18 (and thus the drill bit 46) reach the bottom-of-stroke position, the dwell valve plunger 64 is displaced by anvil 56, initiating a dwell cycle. After the dwell cycle is complete, the spring 66 returns the bulkhead 18 to its home or top-of-stroke position, completing the drilling process.

From the above, it is apparent that the countersink drill of the present invention provides a fully automated drill process that is not dependent on operator skill or intervention. Moreover, a completely formed, countersunk hole is produced in a single drilling operation without the need for changing drill bits.

Although this invention has been described with respect to certain exemplary embodiments, it is to be understood that the specific embodiments are for purposes of illustration and not limitation, as other variations will occur to those of skill in the art.

What is claimed is:

1. A portable drill, comprising:
   a stationary portion adapted to be mounted in a fixed position relative to a workpiece in which a hole is to be drilled;
   a movable portion mounted on the stationary portion for linear movement between home and displaced positions respectively representing top-of-stroke and bottom-of-stroke drill positions, the movable portion including a mount, and a drill motor secured to the mount, said drill motor adapted to drive a countersink drill bit, said countersink drill bit adapted to drill and countersink a hole; and,
   a feed motor for displacing the movable portion between the home and displaced positions; wherein the feed motor includes at least one pneumatic cylinder carried on the movable portion and having an output drive shaft drivingly connected to the stationary portion;
   a drive system including an adjustable dwell control comprising a switch, said dwell control switch adapted to control the length of time said drill bit remains in the bottom-of-stroke drill position;
   said movement between said home and displaced position operable to cause said drill bit to drill and countersink a hole.

2. The portable drill of claim 1, including a stop carried on the stationary portion for limiting the displacement of the movable portion and determining the depth of the hole drilled in the workpiece.

3. The portable drill of claim 2, wherein the stop is adjustable whereby to allow the depth of the hole to be selected.

4. The portable drill of claim 1, wherein the dwell control switch comprises a fluid control switch for controlling the operation of the feed motor, the switch being actuated when the drill reaches its bottom-of-stroke position.

5. The portable drill of claim 4, wherein the fluid control switch is mounted on the movable portion.

6. The portable drill of claim 1, further comprising a pneumatic control system for controlling the operation of the feed motor and the time the drill dwells at the bottom-of-stroke position.

7. A drill used in a portable drill fixture for simultaneously drilling and countersinking a hole in a workpiece, comprising:
   a support attachable to the drill fixture;
   a mount carried on the support for linear movement toward and away the workpiece;
   a drill motor carried on and movable with the mount between top-of-stroke and bottom-of-stroke positions;
   a countersink drill bit driven by the drill motor;
   a drive system for automatically displacing the mount between the top-of-stroke and bottom-of-stroke positions, whereby the drill bit is fed into the workpiece and the hole is drilled and countersunk in a single drill stroke, said single drill stroke comprising a movement from said top-of-stroke to said bottom-of-stroke positions said drive system comprising a feed motor for displacing the mount between the top-of-stroke and bottom-of stroke positions; wherein the feed motor includes at least one pneumatic cylinder carried on the mount and having an output drive shaft driving connected to the support; and,
   an adjustable dwell control adapted to control the length of time the mount remains in the bottom-of-stroke position wherein said countersunk hole is fully formed, said adjustable dwell control comprising a switch actuated when the mount portion reaches said bottom-of-stroke position.

8. The drill of claim 7, wherein the switch comprises a pneumatic switch carried on the mount and actuated by engagement with the support when the mount reaches its bottom-of-stroke position.

9. The drill of claim 7, wherein the drive control includes an adjustable depth control for controlling the depth of the countersink in the hole.

10. The drill of claim 9, wherein the adjustable depth control is carried on the mount and includes an adjustable stop between the mount and the support for limiting the travel of the mount toward the workpiece.

11. The drill of claim 7, wherein the drive control includes:
    a source of pressurized air,
    air cylinder means powered by the pressurized air source for moving the mount between its top-of-stroke and bottom-of-stroke positions,
    hydraulic cylinder means for regulating the, movement of the mount,
    a switch controlled by an operator for initiating a drill cycle.

12. A portable countersink drill for drilling a countersunk hole in a workpiece, comprising:
    a stationary portion adapted to be mounted in a fixed position relative to a workpiece in which a hole is to be drilled;
    a movable portion mounted on the stationary portion for linear movement between home and displaced positions respectively representing top-of-stroke and bottom-of-stroke drill positions;
    a drill motor for driving a countersink drill bit;
    a power operated drive for automatically moving the drill motor and drill bit through a drill stroke from a top-of-stroke position to a bottom-of-stroke position in which the drill bit drills and countersinks the hole;
    a dwell adjustment for adjusting the length of time that the drill motor dwells at the bottom-of-stroke position, said dwell adjustment comprising a switch actuated at the bottom-of-stroke position, said dwell adjustment switch adapted to control the length of time the mount remains in the bottom-of-stroke position wherein said countersunk hole is fully formed.

13. The portable countersink drill of claim 12, wherein, the dwell adjustment includes:
   said switch actuated by the drive when the drill motor reaches its bottom-of-stroke position,
   a pneumatic control system responsive to actuation of the switch for delaying the return of the drill motor from its bottom-of-stroke position to its top-of-stroke position.

14. The portable countersink drill of claim 12, wherein the drive includes an adjustable depth control for controlling the depth of the countersink in the hole.

15. The portable countersink drill of claim 14, wherein the adjustable depth control includes an adjustable stop limiting the travel of the drill toward the workpiece.

16. The portable countersink drill of claim 14, wherein the drive includes:
   a stationary support,
   a drill motor mount slidable on the support for movement toward and away form the workpiece, and wherein the drill motor is carried on the mount, and
   a pneumatic drive for driving the mount to slide relative to the support.

17. The portable countersink drill of claim 14, wherein the drive includes a pneumatic control system for automatically moving the drill motor and bit through the a single drill stroke in which the hole and countersink are formed simultaneously.

* * * * *

UNITED STATES PATENT AND TRADEMARK OFFICE
CERTIFICATE OF CORRECTION

| | | |
|---|---|---|
| PATENT NO. | : 7,614,832 B2 | Page 1 of 1 |
| APPLICATION NO. | : 11/392100 | |
| DATED | : November 10, 2009 | |
| INVENTOR(S) | : Nappier et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 639 days.

Signed and Sealed this

Nineteenth Day of October, 2010

David J. Kappos
*Director of the United States Patent and Trademark Office*